United States Patent

Maezawa

[11] 3,947,185
[45] Mar. 30, 1976

[54] FIELD EFFECT LIQUID CRYSTAL DISPLAY DEVICE

[75] Inventor: Shuji Maezawa, Suwa, Japan

[73] Assignee: Kabushiki Kaisha Suwa Seikosha, Tokyo, Japan

[22] Filed: Mar. 29, 1974

[21] Appl. No.: 456,335

[30] Foreign Application Priority Data
Mar. 30, 1973 Japan............................ 48-36398

[52] U.S. Cl. ........................................ 350/160 LC
[51] Int. Cl.² ........................................ G02F 1/13
[58] Field of Search ............................. 350/160 LC

[56] References Cited
UNITED STATES PATENTS
3,731,986  5/1973  Ferguson .................... 350/160 LC OTHER PUBLICATIONS
Haller et al., "Achromatic Polarization Rotator" IBM Tech. Discl. Bull. Vol. 13, No. 5, pp. 1211–1212, Oct. 1970.

Primary Examiner—John K. Corbin
Assistant Examiner—Matthew W. Koren
Attorney, Agent, or Firm—Blum Moscovitz Friedman & Kaplan

[57] ABSTRACT

In a field effect twisted nematic mode liquid crystal display device the fraction of the total number of liquid crystal molecules assembled into helical structures having the same direction of twist is greatly increased over that found in the usual construction. A method of preparing the liquid crystal cell to ensure that virtually all of the molecules in the liquid crystal cell are assembled in helices having the same twist direction is also disclosed.

4 Claims, 7 Drawing Figures

FIELD EFFECT LIQUID CRYSTAL DISPLAY DEVICE

BACKGROUND OF THE INVENTION

Liquid crystal display devices using nematic liquid crystals may be classified roughly into those operating by the dynamic scattering mode (DSM) and those operating by the field-effect mode (FEM). FEM liquid crystals may in turn be divided into those showing the DAP effect and those operating in the twisted nematic mode, according to the way of orientation of the liquid crystal molecules. The DAP effect mode includes those nematic liquid crystals having negative dielectric anisotropy and homeotropic alignment wherein the molecular axes are aligned perpendicularly to the plates. The twisted nematic mode crystals includes those having positive dielectric anisotropy and homogeneous alignment wherein the molecular axes of the liquid crystal molecules proximate the plates are aligned in parallel with the plates. Further, where the plate is so treated as to have a preferred direction as by rubbing with cotton or other mild abrasives and the plates are mounted so that the rubbing directions are at an angle to each other, then the liquid crystal molecules at the opposed surfaces make an angle with each other and liquid crystal molecules between the plates form a helix with the molecules at the ends of the helix corresponding in direction to the rubbing direction of the plates The rubbing direction may be termed an orientation of the inner surface of the plates. It is now believed that minute grooves are formed, all of which are essentially parallel when the plate is unidirectionally rubbed. Liquid crystal molecules proximate the surface of the plates fall into these grooves with their molecular axes parallel to the grooves. As aforenoted, when a pair of plates are opposed to each other and spaced apart so that a cell may be formed which can contain liquid crystal molecules, a helical structure results. This helical structure is stable only in the absence of an electric or magnetic field. If a sufficiently strong electric field is applied the spiral structure is broken down, this being due to the dipole moments of the molecules causing them to orient themselves parallel to the field. As a result of the helical structure, a cell containing liquid crystals such as are under discussion here can rotate the plane of polarization of linearly polarized light through an angle corresponding to the twist angle between the plates. When a sufficiently strong electric field is applied between the plates, the optical activity disappears.

As aforenoted, the liquid crystal molecules adjacent a surface follow the orientation of that surface. However, in lining up within the grooves, the molecules within a groove or in adjacent grooves may be either parallel to each other or anti-parallel to each other. Accordingly, the terms normal direction (the "normal" direction being selected arbitrarily) and the reverse direction may be used. Since there are two concurrent directions at each of the inner surfaces, there are four combinations in all. In the conventional twisted nematic mode liquid crystal display device, although not all four combinations may be produced as evidenced by the twist direction of helices formed between the plates, there are, nevertheless, a plurality of combinations formed. The different combinations are observed as domains on the display surface. The alignment of the liquid crystal molecules is therefore different in each domain. The practical result of this phenomenon is that the contrast observed on activation of a display varies with the direction of observation. Also, the intensity of the display will be a function of the point from which the display is viewed. It would be desirable to eliminate the difference in contrast resulting from the phenomenon described; in order to do this, it would be necessary to align the liquid crystal molecules so that the liquid crystal layer is, in effect, monocrystalline. To put this in another way, the twist direction of the great majority, and if possible, all, of the helices between the plates should be the same.

SUMMARY OF THE INVENTION

In a liquid crystal display device using liquid crystals of positive dielectric anisotropy the observed contrast of the display is rendered independent of the direction from which it is viewed by constructing the cell in such a way that the major portion if not virtually all of the liquid crystal molecules in the cell are aligned in helices having axes perpendicular to the surfaces of the cell walls and having the same direction of twist. Two means of achieving this objective are disclosed herein, said means being usable either alone or in combination, the use of said two means in combination giving an enhanced effect. In the first of these means the angle between the two rubbing directions of the opposing cell walls is established either in the range of 65° to 89° or in the range from 91° to 115°. When the angle is in the former range, nematic liquid crystals are used in which the potential energy increases with increase in twist angle. When the latter range is used, nematic liquid crystals are used which have the characteristic of a decrease in potential energy with increase in twist angle.

For the second mode of increasing the fraction of molecules lying in helical structures having the same twist direction, a filling hole and a venting hole are formed in the wall of the cell which is to contain the liquid crystals, the two holes being positioned in a pair of vertical angles formed by the rubbing directions on the opposed cell walls. It is to be noted at this point, that each of the rubbing directions is considered to include a normal direction and a reverse direction.

when liquid crystal material is poured into the cell through the filling hole, it will flow through the cell toward the vent hole. As the liquid crystal material flows, the molecules of liquid crystal material will tend to orient themselves so that the rear part of the liquid crystal either corresponds to the fore part of the orientation of the inner surface or the converse. Where the rear part of the liquid crystal as established by the direction of flow from one hole toward the other corresponds to the fore part of the orientation of the inner surface then the liquid crystal is poured into that hole which is in the angle formed by the two normal directions of the rubbed surfaces. When the converse is true, the hole in the vertical angle formed by the reverse directions of the rubbed surfaces is used as the filling hole and the hole in the corresponding vertical angle is used as a vent hole. Positioning of the two holes and selection of which is to be the filling hole and which the vent hole in accordance with this rule leads to proper orientation of the liquid crystal molecules so that the domain effect is minor. Combination of the two means, namely selection of the proper angle range between the two rubbing directions in accordance with the potential energy relationship of the type of liquid crystal used, and selection of which of the two holes to use as the filling hole leads to almost complete elimination of the domain effect.

Accordingly, an object of the present invention is an improved liquid crystal display device wherein the degree of contrast attainable is essentially free of variation resulting from a change of the viewing angle.

Another object of the present invention is an improved liquid crystal display device in which a preponderance of the molecules are arrayed in helices having the same twist direction.

A further object of the present invention is an improved liquid crystal display device in which the interior surfaces of the cell walls are unidirectionally rubbed and the angle between the directions of rubbing on the two plates fall within two specified ranges.

An important object of the present invention is an improved liquid crystal display device in which the angle between the rubbing directions of the cell walls are correlated with the potential energy curves of the type of liquid crystal used.

An important object of the present invention is a method of filling the cell in a liquid crystal display device which results in enhanced contrast and freedom from dependence on the angle of view.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1A:
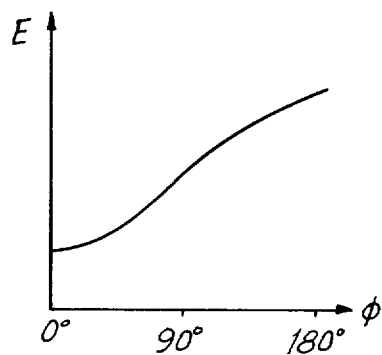
FIG. 1a is a graph of potential energy of one type of nematic liquid crystal molecules as a function of twist direction.

As is known, when nematic liquid crystals having positive dielectric anisotropy are placed between the walls of the cell, where each of the cell walls has been unidirectionally rubbed and the cell plates have been so mounted that there is an angle between the directions of rubbing, then the liquid crystal molecules adjacent the surfaces align themselves with grooves formed in the cell walls and the liquid crystal molecules intermediate the plates form themselves into a helix having a twist angle between its ends corresponding to the angle between the rubbing directions of the two plates. The axis of the helix is, of course, perpendicular to the surfaces of the cell walls. This phenomenon is used for display purposes by placing the cell between polarizer and analyzer plates and by applying an electric field of sufficient voltage to transparent conductive segments of thin film on opposed surfaces of the plates.

As aforenoted, the liquid crystal molecules adjacent the surface orient themselves in accordance with the grooves on said surfaces. However, the grooves on each plate may be considered as having a preferred direction, termed the normal direction. Consequently, the liquid crystal molecules which are in the grooves may be oriented in either of two directions, the normal direction or the reverse direction. The difference arises from the fact that the nematic liquid crystals of positive dielectric anisotropy are asymmetric with respect to the ends thereof.

Since there are two directions, namely a normal and a reverse direction for each of the plates, the four angles between the two sets of rubbing directions may be regarded as different with respect to the way in which liquid crystal molecules between the plates will be oriented. In these four angles the molecules of the liquid crystal material will be subjected to different forces as to the way in which they will be oriented. Although there are four sets of forces, not all four sets are represented in the orientation, necessarily. However, there are different alignments and each specific alignment may occur in a specific area which is termed a domain. The alignment of the liquid crystal molecules may be different in every domain.

As a result of this domain effect, the contrast observed when the display is actuated varies in accordance with the direction of observation. It is desirable to avoid this phenomenon as by reducing the plurality of domains to a single domain, which, in effect implies that the liquid crystal layer between the cell walls is in what is essentially a monocrystalline condition. When this is achieved, the difference in contrast observed with difference in direction of observation disappears.

Conventionally, when using nematic liquid crystals of positive dielectric anisotropy, the angle between the rubbing directions on the inner surface of the plates is set at 90° so that the twist angle is 90°. Under such conditions the domain effect is usually present. As the first means of avoiding this effect, advantage is taken of the effect of the twist angle. It has now been established that the twist angle should preferably lie in one of the ranges 65°–89° and 91°–115°.

Figure 1B:
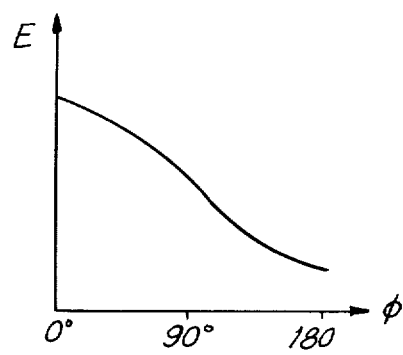
FIG. 1b is a graph of another type of liquid crystal molecules as a function of twist direction.

The selection of the appropriate twist angle range depends on the relationship between the potential energy of the molecules arrayed in a helix and the twist angle of the helix. The nematic liquid crystals of positive dielectric anisotropy fall into two classes by this criterion, the first of which, termed type a increases in potential energy (E) with increase in twist angle ($\phi$) and the second of which, termed b decreases in potential energy (E) with increase in twist angle ($\phi$). These two types of relationship between E and $\phi$ are apparently determined by the structure of the liquid crystal molecules and the intermolecular forces resulting from the structure. FIGS. 1a and 1b are graphs showing the forms of relationships between E and φ for the two types of molecules.

Figure 2:
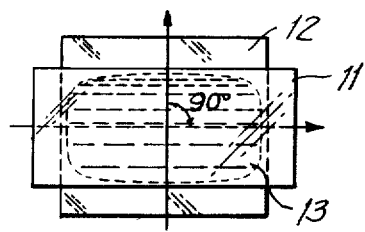
FIG. 2 is a plan view of a liquid crystal cell having unidirectionally rubbed interior wall faces where the angle between the rubbing directions is 90°.

The cell shown in FIG. 2 consists of a front plate 11 and a rear plate 12. The rubbing direction of the inner surface of front plate 11 is shown as a solid line and that of the rear plate 12 is shown as a dashed line. In the construction shown the angle between the rubbing directions of the two surfaces is 90°. The surface orientation of the liquid crystal molecules wherein the molecules lie in a preferred direction, or normally, to the orientation of the inner surface of the plate is termed the normal surface orientation and the orientation of the molecules wherein they lie in the reverse direction is called the reverse surface orientation. The liquid crystal moleucles are essentially free to select either of the orientations with respect to a specific set of grooves. Apparently the surface forces between the grooves and the axes of the liquid crystal molecules are such that when the molecule is in a specific orientation there is little tendency for the molecule to reverse itself. Consequently, the method of obtaining uniform surface orientation must depend on the relationship between the potential energy and the twist angle.

The first case to be considered is that in which the twist angle φ is 90°. Assume that the molecules in contact with front plate 11 are in the normal orientation and those with the rear plate 12 have either the normal or the reverse orientation, then the orientations in the domains can be either normal-normal or normal-reverse. In both cases the twist angle is 90°, taking into account the fact that 180°–90° equals 90°. Consequently, the potential energy will be the same for both orientations. From this it follows that the stability is the same for the normal-normal surface orientations and the normal-reverse surface orientations. The twist angle, i.e., the direction of rotation of the helix formed will be either right-handed or left-handed, and with the potential energies for the two configurations being the same, a domain once being generated or established will not be changed.

Figure 3:
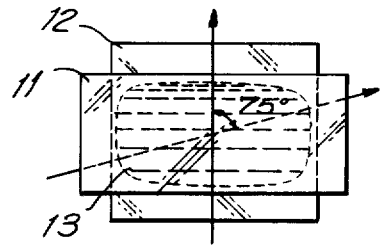
FIG. 3 shows a liquid crystal cell similar to that of FIG. 2 where the angle between the rubbing directions is 75°.

The situation in FIG. 3 where the angle φ is 75° will now be considered. For the normal-normal surface orientation the twist angle is 75° and for the normal-reverse surface orientation the twist angle is 105° (180° minus 75° equals 105°). Where type $a$ liquid crystals are used, the helix having a twist angle of 75° in the normal-normal surface orientation is the more stable, and the portion having the twist angle of 105° with respect to the surface orientation becomes more unstable. The reason why the surface portion having the twist angle of 75° in the normal-normal surface orientation has enhanced or double stability is that both surfaces against which the molecules make contact have the normal orientations so that the surface has a twist angle of 75°. In contrast, the portion having the twist angle of 105° has a normal-reverse surface orientation so that increased or double instability is present and there is a large possibility of a change to the twist angle of 75° corresponding to the normal-normal surface orientation. As a result, the molecules fall into arrays in which the helices have a single twist direction. If type $b$ liquid crystals were used in such an arrangement, it would be difficult to obtain a uniform surface orientation.

Figure 4:
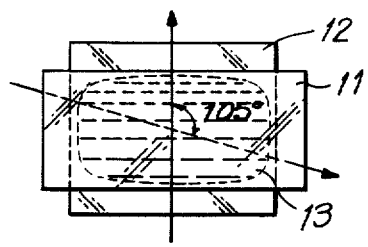
FIG. 4 shows another embodiment of the cell of FIG. 2 in which the angle between the rubbing direction is 105°.

FIG. 4 shows the case for which the angle φ is 105°. In this case in which type $b$ liquid crystals are used, the portion having the twist angle of 105° in the normal-normal surface orientations has enhanced or double stability with respect to the portion having the twist angle of 75° in the normal-reverse surface orientation. Using type $b$ liquid crystals it is possible to make the surface orientation of the liquid crystal molecules follow the orientation of the inner surfaces of the plates uniformly so that the preponderance of the domains have the same direction of rotation. If type $a$ liquid crystals were used instead it would be difficult to make the surface orientation of the liquid crystal molecules accord with the orientation of the inner surface of the plates uniformly.

It would appear from the above analysis of the situation that the larger the difference between the twist angle φ and 90°, the more easily and completely uniform surface orientation could be obtained, and tests have shown that this is correct. However, when the difference between φ and 90° is large, clear visibility as a display device cannot be obtained, the reason being that the system is used in combination with a polarizer and an analyzer. Consequently, the optimum ranges for the twist angle φ lie between 65° and 89° and between 91° and 115°.

A further improvement in the uniformity of the twist direction of the liquid crystal helices and therefore in the operation of the cell as part of a liquid crystal display device can be provided through the effect of the way in which the liquid crystal material is placed in the cell.

Figure 5:
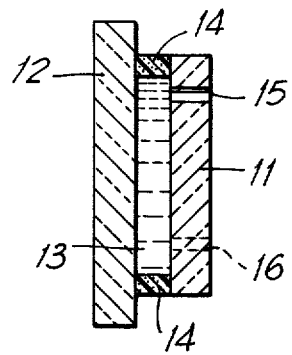
FIG. 5 is a sectional view of a liquid crystal cell having a vent hole and a filling hole in a wall thereof.
Figure 6:
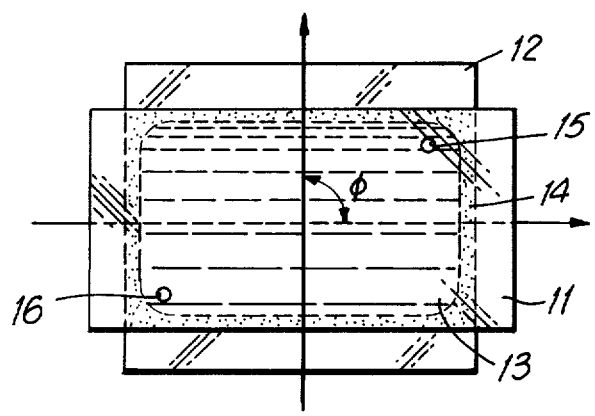
FIG. 6 is a plan view of the cell of FIG. 5 in which a filling hole and a vent hole are located in a pair of vertical angles established by the rubbing directions of the interior faces of the cell walls.

FIGS. 5 and 6 show an example of a cell in which the flow direction of the liquid crystals during the process of inserting the liquid crystals into the cell can be controlled. As before, the cell has a front plate 11 and a rear plate 12, both of which are fitted with transparent electrodes on the inner surfaces thereof. The liquid crystal material 13 is in the form of a thin layer between front and rear plates 11 and 12. A spacer 14 seals the liquid crystal into the cell. Two openings through a wall in the cell are shown for injecting the liquid crystal and for venting the space between the liquid crystal. For purposes of the presentation herein, hole 15 is assumed to be that through which the liquid crystal is injected and hole 16 is considered to be that from which air is exhausted. The direction lines of the orientations of the inner surfaces of plates 11 and 12 are shown by arrows passing through the center of thin layer surface 13. Again, as before, the solid arrow corresponds to front plate 11 and the dashed arrow corresponds to rear plate 12. As will be observed, holes 15 and 16 are disposed in a single pair of vertical angles of size φ which is defined by the rubbing directions on the two plates.

It will now be assumed that the liquid crystals are injected through hole 15 and that air and excess liquid crystals are vented through hole 16. Taking account of the fact that liquid crystal molecules of either type $a$ or type $b$ have non-symmetric structure and anisotropic viscosity, the molecules of liquid crystal will have a tendency to be aligned in a fixed, single direction as they flow through the space between the plates. Accordingly, it is necessary that the filling hole and the vent hole shall be consistent with the direction of the orientation of the inner surface of the plate. Consequently, it is necessary that holes 15 and 16 lie respectively in each of a pair of angles which are vertical to each other. Furthermore, filling hole 15 is used with that type of liquid crystal wherein the rear part of the liquid crystal corresponds to the fore part of the orientation of the inner surface, taking account of the direc tion in which the liquid crystal molecules flow. When the liquid crystal molecules are of the opposite type, the position of the holes is reversed, in other words, hole 16 becomes the filling hole and hole 15 becomes the vent hole. By proper selection of through-holes 15 and 16 in accordance with the conditions outlined, the liquid crystal molecules can readily be made to follow the orientation of the inner surfaces of the cell walls correctly and the domain effect is almost completely eliminated.

For essentially complete elimination of the domain effect, the twist angle is selected to lie in the range which is appropriate to whether the liquid crystal material is of type $a$ or type $b$ and the filling and vent holes again, are appropriately positioned to correspond to the orientation of the molecules during flow. By combining the two effects, virtually complete uniformity of orientation of the molecules to correspond with the orientation of the inner surfaces can be achieved and the generation of domains within the display device can be eliminated. As a result, the variation in contrast with the direction from which the device is observed is eliminated and variations between display devices of the same type can also be eliminated.

It should be noted that in order to use the effect of the direction of flow over as large an area as possible of the display device, the filling and vent holes 15 and 16 should be close to the periphery of the cell, as is shown in both FIG. 5 and FIG. 6.

The present invention is applicable to all twisted nematic mode liquid crystal display devices and increases the attractiveness of such devices. The invention is suitable for use with display devices used in timepieces, electronic desk calculators, and other instruments, and particularly where such devices are to be observed from a variety of directions.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a liquid crystal display device, a cell comprising opposed unidirectionally rubbed transparent plates, said plates being mounted so that said rubbing directions are at an angle to each other, the angle for said rubbing directions lying between 65° and 89° for type $a$ liquid crystals, type $a$ liquid crystals having the characteristic of an increase in potential energy with increase in angle between rubbing directions on opposed cell plates when placed therebetween, the angle for said rubbing directions lying between 91° and 115° for type $b$ liquid crystals, type $b$ liquid crystals having the characteristic of a decrease in potential energy with increase in angle between rubbing directions on opposed cell plates when placed therebetween, transparent conductors on the inner faces of said plates, and field effect nematic liquid crystal between said plates, said liquid crystal being a member selected from the group consisting of types $a$ and $b$, said liquid crystal having a helical structure about an axis perpendicular to said plates, a substantial preponderance of the molecules in said liquid crystal lying in helices of the same twist direction.

2. A cell as defined in claim 1 wherein said liquid crystal is of type $a$, said plates lying with their rubbing directions at an angle between 65° and 89°.

3. A cell as defined in claim 1, wherein said liquid crystal is of said type $b$, said plates lying with their rubbing directions at an angle between 91° and 115°.

4. A cell as defined in claim 1, wherein said cell has a filling hole and a venting hole in a wall of said cell, each of said holes being within a different angle of a pair of vertical angles formed by said rubbing directions and one of said pair of vertical angles being the angle between said rubbing directions.

* * * * *

Disclaimer 3,947,185.—*Shuji Maezawa*, Suwa, Japan. FIELD EFFECT LIQUID CRYSTAL DISPLAY DEVICE. Patent dated Mar. 30, 1976. Disclaimer filed Apr. 25, 1980, by the assignee, *Kabushiki Kaisha Suwa Seikosha*.
Hereby enters this disclaimer to claims 1 and 2 of said patent.
[*Official Gazette June 24, 1980.*]